Patented Dec. 26, 1950

2,535,173

UNITED STATES PATENT OFFICE 2,535,173

3 - PHOSPHONOPROPANE - 1,1, - DICARBOXYLIC ACID ESTERS AND METHOD OF PREPARATION

Pliny O. Tawney, Passaic, N. J., assignor to United States Rubber Company, New York, N. Y., a corporation of New Jersey No Drawing. Application February 25, 1949, Serial No. 78,460

5 Claims. (Cl. 260—461)

This invention relates to certain new organophosphorus compounds and to a method of preparing them. More particularly, the invention relates to compounds resulting from the alkaline catalyzed addition of dialkyl esters of malonic acid or of dialkyl esters of mono-alkyl malonic acid to esters of ethenephosphonic acid.

It is an object of my invention to provide new and useful organophosphorus compounds. Another object is to provide a method for the synthesis of such compounds.

The compounds obtained from the practice of my invention are useful as intermediates in the synthesis of other chemicals, and as plasticizers, insecticides, heat transfer agents, lubricants, hydraulic fluids, and textile-treating materials.

It is known that, in the presence of alkaline catalysts, compounds containing an active or acidic hydrogen atom may undergo addition reaction with various ethylenically unsaturated compounds such as esters of alpha-unsaturated carboxylic acids, in which the ethylenically unsaturated group is activated by virtue of its conjugated relationship to the carbonyl group. I have now discovered that dialkyl esters of malonic acid and of mono-alkyl malonic acid will undergo addition reaction with ethylenically unsaturated compounds in which the ethylenic group is in conjugated relationship to the group

It has not heretofore been known that ethenephosphonic acid esters would behave in this way.

Specifically, I have discovered that dialkyl esters of malonic acid and mono-alkyl malonic acid will react with dialkyl esters of ethenephosphonic acid to give a series of new and useful organophosphorus compounds. The reaction may be illustrated by the following equation:

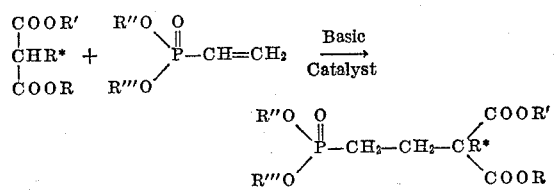

wherein R, R', R'' and R''' are alkyl groups and R* is either hydrogen or an alkyl group.

The addition reaction of my invention is most advantageously carried out by heating the reactants in the presence of a basic catalyst to an elevated temperature which may conveniently range from 65° C. to 150° C. Often temperatures of the order of 100° C. to 110° C. are employed.

Any dialkyl ester of malonic acid or of any monoalkyl malonic acid may be used in the practice of my invention. The alkyl groups typically may contain from 1 to 10 carbon atoms. Usually the alkyl groups in the two ester groups are identical. I generally use dialkyl esters of malonic acid itself, the diethyl ester being particularly suitable.

Any dialkyl ester of ethenephosphonic acid may be used in the practice of my invention. The alkyl groups therein may be the same or different.

The alkyl groups typically may contain from 1 to 10 carbon atoms. Examples of alkyl groups (R, R', R'', R''' and R*) include methyl, ethyl, propyl, butyl, amyl, hexyl, heptyl, octyl, etc.

While the proportions of the dialkyl ester of malonic acid or of mono-alkyl malonic acid and the dialkyl ester of ethenephosphonic acid employed as the reactants may vary within wide limits, it is often preferred to use them in approximately equimolecular proportions.

The preferred catalyst is an alkali metal salt of the dialkyl ester of malonic acid or dialkyl ester of mono-alkyl malonic acid used as a reactant. This catalyst is most conveniently made by dissolving the alkali metal in a suitable excess of the dialkyl ester, the resulting solution being used directly in the reaction. Sodium metal is preferred for this purpose. However, other alkali metals such as potassium, lithium, etc. may be used.

Other basic materials may be used as catalysts in carrying out the addition reaction of the present invention. Examples include oxides, hydroxides and alcoholates of alkali metals; alkaline earth metal) such as calcium, barium and strontium) oxides, hydroxides, salts of dialkyl esters of malonic acid and salts of dialkyl esters of mono-alkyl malonic acid; and organic bases, e. g., amines, such as pyridine, piperidine, and various quaternary ammonium hydroxides such as trimethyl benzyl ammonium hydroxide, etc.

The amount of catalyst required to effect the reaction is extremely small, commonly ranging from 0.01 to 0.2 mole per mole of the dialkyl ester of malonic acid or of mono-alkyl malonic acid.

The reaction is preferably carried out under substantially anhydrous conditions which are easily attained by the use of anhydrous reactants and by carrying out the reaction in such a manner that access of extraneous moisture is prevented.

The reaction is preferably continued until it is substantially complete as is indicated by the substantially complete consumption of whichever reactant is present in a molar deficiency where proportions other than equimolar are employed or by substantially complete consumption of each of the reactants in the usual case where equimolecular proportions are used. The duration of the reaction may vary widely. Following the attainment of the desired completeness of reaction the addition reaction product is recovered from the reaction mixture in any suitable manner, conveniently by distillation, preferably under vacuum to minimize decomposition.

The following example illustrates my invention in more detail. All parts are by weight.

*Example*

To a solution of 0.2 part of sodium in 48 parts of diethyl malonate there is added 49.2 parts of diethyl ethenephosphonate. The solution is heated for 140 hours at 100–110° C. and is then distilled to recover 41.4 parts of the tetraethyl ester of 3-phosphonopropane-1,1-dicarboxylic acids,

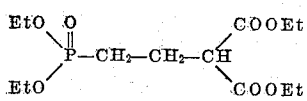

which boils at 157–161° C./0.2 mm.

Having thus described my invention, what I claim and desire to protect by Letters Patent is:

1. The process which comprises effecting addition reaction of a dialkyl ester of an acid selected from the group consisting of malonic acid and mono-alkyl malonic acids and a dialkyl ester of ethenephosphonic acid in the presence of a basic catalyst and thereby forming a compound having the type formula

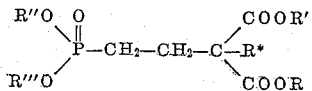

where R, R', R'' and R''' are alkyl groups and R* is selected from the group consisting of hydrogen and alkyl groups.

2. The process of claim 1 wherein said addition reaction is effected by heating a mixture of said esters and an alkali metal salt of said dialkyl ester of said acid selected from said group as the catalyst.

3. The process which comprises effecting addition reaction of diethyl malonate and diethyl ethenephosphonate by heating a mixture thereof with an alkali metal salt of diethyl malonate and thereby forming the tetraethyl ester of 3-phosphonopropane-1,1-dicarboxylic acid.

4. A new chemical compound having the type formula

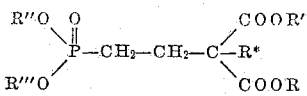

where R, R', R'' and R''' are alkyl groups and R* is selected from the group consisting of hydrogen and alkyl groups.

5. The tetraethyl ester of 3-phosphonopropane-1,1-dicarboxylic acid.

PLINY O. TAWNEY.

REFERENCES CITED

The following references are of record in the file of this patent:

UNITED STATES PATENTS

| Number | Name | Date |
| --- | --- | --- |
| 2,356,754 | Farrington et al. | Aug. 29, 1944 |